(12) United States Patent
Zernickel et al.

(10) Patent No.: US 7,846,031 B2
(45) Date of Patent: Dec. 7, 2010

(54) UNIVERSAL JOINT SOCKET WITH AXIAL GUIDING

(75) Inventors: Alexander Zernickel, Herzogenaurach (DE); Martin Kruppa, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 402 days.

(21) Appl. No.: 11/912,734

(22) PCT Filed: Feb. 1, 2006

(86) PCT No.: PCT/EP2006/000839

§ 371 (c)(1),
(2), (4) Date: Oct. 26, 2007

(87) PCT Pub. No.: WO2006/114138

PCT Pub. Date: Nov. 2, 2006

(65) Prior Publication Data

US 2008/0194342 A1 Aug. 14, 2008

(30) Foreign Application Priority Data

Apr. 28, 2005 (DE) ........................ 10 2005 019 692

(51) Int. Cl.
*F16D 3/41* (2006.01)

(52) U.S. Cl. .................. 464/132; 384/454; 384/615
(58) Field of Classification Search ................ 464/132, 464/128–131, 136; 384/454, 615
See application file for complete search history.

(56) References Cited

U.S. PATENT DOCUMENTS 2,063,787 A * 12/1936 Brown .................. 384/454
3,765,736 A * 10/1973 Pitner
6,733,415 B2 * 5/2004 Yamamoto .............. 384/615 X

FOREIGN PATENT DOCUMENTS

| BE | 857 145 A | 11/1977 | |
|----|-----------|---------|---|
| DE | 18 27 229 Y | 2/1961 | |
| DE | 21 20 569 Y | 11/1972 | |
| EP | 1 001 182 A | 5/2000 | |
| GB | 891 479 XY | 3/1962 | |
| JP | 09 196082 | * 7/1997 | |
| JP | 09 196082 Y | 7/1997 | |
| SU | 1572722 A1 | * 6/1990 | ........... 464/132 |

* cited by examiner

*Primary Examiner*—Greg Binda
(74) *Attorney, Agent, or Firm*—Lucas & Mercanti, LLP

(57) ABSTRACT

A universal joint having a spider provided with four staggered journals. A socket having an axial bearing in addition to a radial bearing is associated with each journal. The axial bearing has rolling bodies that are guided between a front surface of the journal and the bottom of the universal joint socket.

7 Claims, 3 Drawing Sheets

UNIVERSAL JOINT SOCKET WITH AXIAL GUIDING

FIELD OF THE INVENTION

The present invention relates to the universal joint of a cardan shaft, said universal joint being arranged between two shafts oriented at an inclination angle. For this purpose, each shaft is provided on the end face with a joint fork. A spider with four journals offset at 90° with respect to one another connects the joint forks, in each case two journals being assigned to a joint fork. The journals are in each case inserted via a universal joint socket, in conjunction with a needle ring as a radial bearing, into the joint forks in pairs.

BACKGROUND OF THE INVENTION

For universal joints used nowadays in cardan shafts, transmission as free of play as possible is required between the universal joint sockets and the spider. For the compensation of production-related and installation-related play between the journal of the spider and the universal joint socket in the axial direction, it is known to press the universal joint socket under prestress against the journal of the spider.

The functioning and quality of a universal joint, which is also to be designated as a cardan joint, is assessed particularly in terms of the generation of noise, true running and oscillation behavior. For this purpose, the absence of axial play between the journal of the spider and the respective universal joint socket is critical. The axial play is determined, in particular, by a narrow tolerance of the dimension between the bottoms of two opposite universal joint sockets in relation to the end faces of the universal joint journals.

A generic universal joint is known from DE 21 20 569 A. The rolling bearing ball arranged centrically between the end face of the journal and the bottom of the universal joint socket is guided partially in a recess of the journal and in a further recess of the bottom of the universal joint socket. This set-up does not allow a play-free orientation of the journal with respect to the universal joint socket.

Publication DE 21 22 575 A, also known, shows a universal joint socket, in which only a relatively flat spring characteristic curve can be achieved because the universal joint socket has to be mounted under pressure force and has a bottom with a small wall thickness. This spring characteristic curve, combined with the projecting run-on surface directed toward the journal at the center of the bottom, initially fulfils the condition of play-free bearing contact. The pressure force has the disadvantageous effect of causing a vaulting of the run-on surface, with the result that the end face of the journal initially runs solely on the outermost edge of the run-on surface. After a run-in phase, that is to say after the vaulting has rubbed off, a planar run-on surface is established between the end face of the journal and the bottom. This is associated with a reduced pressure force which, in the unfavorable case, is not sufficient for compensating the axial play between the journal and the universal joint socket.

OBJECT OF THE INVENTION

The object on which the present invention is based is to provide a durable play-free universal joint by means of measures which can be implemented cost-effectively.

SUMMARY OF THE INVENTION

In the universal joint according to the invention, all the journals of the spider are supported and guided on the bottom of the universal joint socket via an axial bearing designed as an angular ball bearing. The angular ball bearing employed, which can also be designated as an inclined shoulder bearing, forms a closed annular supporting contact between the journal of the spider and the bottom of the universal joint socket. Advantageously, the axial bearing, employed as an angular ball bearing and comprising at least two rolling bodies, between the end face of the journal and the bottom of the universal joint socket is designed such that it ensures an effective centering of the spider with respect to the universal joint socket.

This measure is beneficial to the desired play-free arrangement of the spider in order to achieve a noise-optimized, oscillation-free universal joint. The configuration of the axial bearing, in conjunction with a corresponding prestress, is such that a tolerance-related and/or installation-related radial play has no effect or can be compensated. In the operating state, with a growing introduction of torque into the universal joint, the forces which occur are initially introduced into the bottom of the universal joint socket by the axial bearing. In the event of a rise of torque into the universal joint, the journals of the spider are supported on the radial bearing, the needle ring, and thereby advantageously prevent an overloading of the axial bearing.

The concept according to the invention for avoiding axial play within the universal joint by means of an axial bearing requires neither an increased outlay in manufacturing terms nor complicated assembly. On the other hand, the measure according to the invention, in addition to optimal axial play compensation, causes effective centering, a reduced noise development and a diminished bending moment of the universal joint.

A preferred set-up of the universal joint according to the invention comprises an axial bearing, the rolling bodies of which are guided in raceways which are introduced in the journal and the bottom of the universal joint socket. To achieve a reinforced centering effect, the raceways for the rolling bodies of the axial bearing have apex lines offset radially with respect to one another. The defined radial offset which is established in the raceways in the end face of the journal and the bottom of the universal joint socket results in an inclined ball bearing or inclined shoulder bearing, by means of which the desired play compensation can be implemented effectively in the axial direction.

As a differential dimension between the deviating diameters of the raceways for the rolling bodies, the apex lines, in the bottom of the universal joint socket and the end face of the journal, according to the invention a dimension of $\geq 0.5$ mm is provided.

The axial bearing of the invention advantageously comprises a fully spherical arrangement of rolling bodies. Alternatively to this, it is appropriate to use an axial bearing in which the rolling bodies are guided in a separate cage.

The apex points, offset radially with respect to one another, of the raceways for the rolling bodies constitute an essential feature of the invention for achieving an optimal centering of the journal. Obliquely running linear contact of the rolling bodies is consequently established between the raceways arranged so as to be offset, said linear contact setting a pressure angle of $\geq 45°$ with respect to the longitudinal axis of the universal joint journal.

Alternatively to directed centering of the journal with respect to the bottom of the universal joint socket, the invention includes an axial bearing in which the rolling bodies are guided only on one side in one raceway. In this set-up, the rolling bodies are preferably guided in an end-face raceway of the journal and, on the other hand, are supported on a planar level surface of the bottom of the universal joint socket. This measure ensures a reduced bending moment of the universal joint without a centering of the journal. By means of a raceway of appropriate depth, which is introduced into the end face of the journal and which, for example, exceeds the diameter of the rolling body, in conjunction with the level bottom of the universal joint socket, a reduced axial distance between the end face of the journal and the bottom of the universal joint socket is advantageously established, with the result that a universal joint optimized in terms of construction space can be implemented.

The invention includes, furthermore, a configuration of the universal joint socket which has different wall thicknesses. For this purpose, it is appropriate to design the wall thickness "$s_1$" of the profiled bottom, having a raceway for the rolling bodies, of the universal joint socket so as to be smaller than the wall thickness "$s_2$" of the cylindrical portion of the universal joint socket. This measure makes it possible to form the raceway into the bottom in a simplified and non-cutting way. By virtue of the raceway contour, a stiffening of the bottom occurs, so that the latter, even in the case of a reduced wall thickness, has sufficient rigidity or strength.

A further design feature of the invention relates to an axial projecting dimension between the apex line of the rolling body raceway and the level portion of the bottom of the universal joint socket. A dimension of $\leq 0.8$ mm is preferably provided in this case as the projecting dimension.

The universal joint according to the invention is preferably used in a cardan shaft intended for vehicle steering. The effective play compensation, on the one hand, and the advantageously reduced bending moment, on the other hand, lead to direct delay-free steering which improves steering comfort and consequently avoids an adverse spongy feeling during steering.

Furthermore, for the universal joint according to the invention, there is provision for carrying out the assembly of the universal joint sockets by means of a device in which in each case two universal joint sockets are pressed into opposite bores of a joint fork. Synchronously with this, a defined deformation of the bottom of the universal joint socket is carried out in order to form the raceway for the rolling bodies of the axial bearing. By means of the device, stamped noses are finally formed into the bores of the joint fork, by means of which stamped noses an effective fixing of the respective universal joint socket in position can be achieved. During the pressing-in operation and the simultaneous bottom deformation of the universal joint socket, the deformation or the installation position is monitored via a measuring arrangement designed as a measuring tracer.

BRIEF DESCRIPTION OF THE DRAWINGS

Exemplary embodiments of the invention are illustrated in the drawings which are described below.

In the drawings.

DETAILED DESCRIPTION OF THE DRAWINGS

Figure 1:
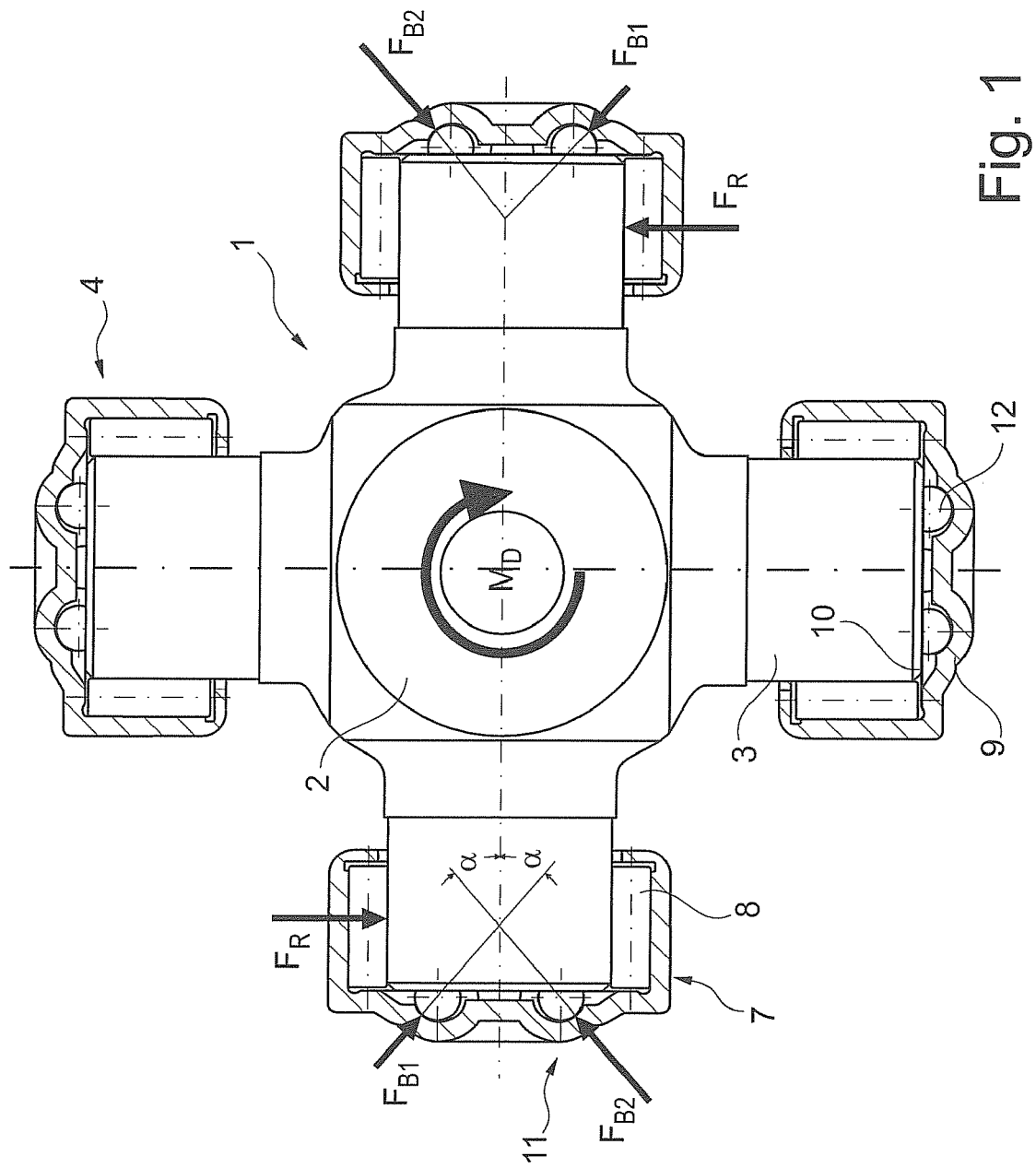
FIG. 1 shows a universal joint in which each journal is assigned a universal joint socket with an integrated axial bearing.
Figure 3:
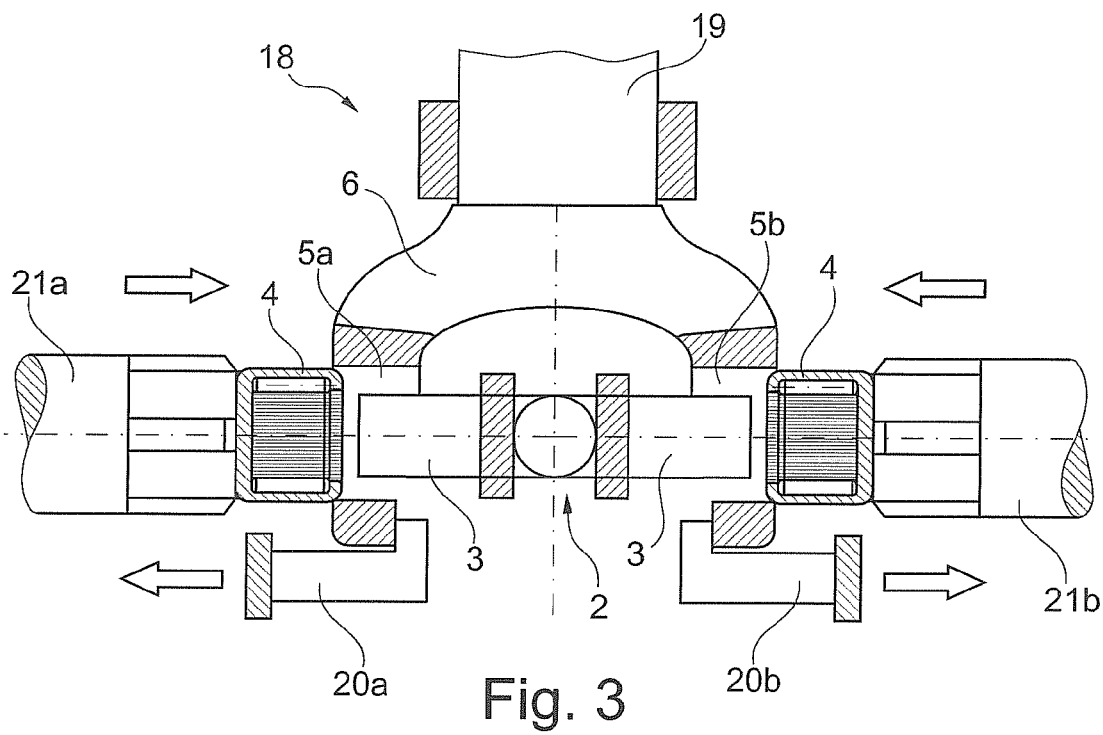
FIG. 3 shows a device by means of which the universal joint sockets are pressed into bores of a joint fork.

The universal joint 1 depicted in FIG. 1 comprises a spider 2 with four journals 3 arranged in each case so as to be offset at 90° with respect to one another. Each journal 3 is assigned a universal joint socket 4 which is a component which has a pot-like shape and is produced from sheet steel in a non-cutting way and which in each case surrounds the journal 3 on the end face. As illustrated in FIG. 3, in the installation state, in each case two opposite universal joint sockets 4 are pressed into bores 5a, 5b of a joint fork 6. An actuating or pivoting movement of the spider 2 with respect to the universal joint sockets 4 pressed at a fixed location in the joint fork 6 is permitted by a radial bearing 7 which comprises cylindrical rolling bodies forming a needle ring 8. The installation space for the needle ring 8 is delimited on the inside by a surface area of the journal 3 and on the outside by an inner contour of the universal joint socket 4.

Between a bottom 9 of the universal joint socket 4 and an end face 10 of the journal 3 is inserted an axial bearing 11 designed as an inclined ball bearing. The rolling bodies 12 of the axial bearing 11 are guided on the end face 10 and the bottom 9 of the universal joint socket 4. In the installation position, the spider 2 is centered, free of play, in the axial direction by virtue of the axial bearing 11 designed as an inclined ball bearing. The axial bearing 11, in one embodiment, includes a fully spherical arrangement of the rolling bodies 12.

In the operating state, in which, for example, a torque "$M_D$" acting clockwise is introduced into the universal joint 1, the occurring forces "$F_{B1}$" and "$F_{B2}$" are each initially supported at a pressure angle "$\alpha$" via the axial bearing 11. If there is play in the radial bearing 7, this is compensated by virtue of the prestressed axial bearing 11 centering the spider 2. In the case of a rising torque "$M_D$", the journals 3 are supported via the radial bearing 7, so that an overloading of the axial bearing 11 is prevented.

Figure 2:
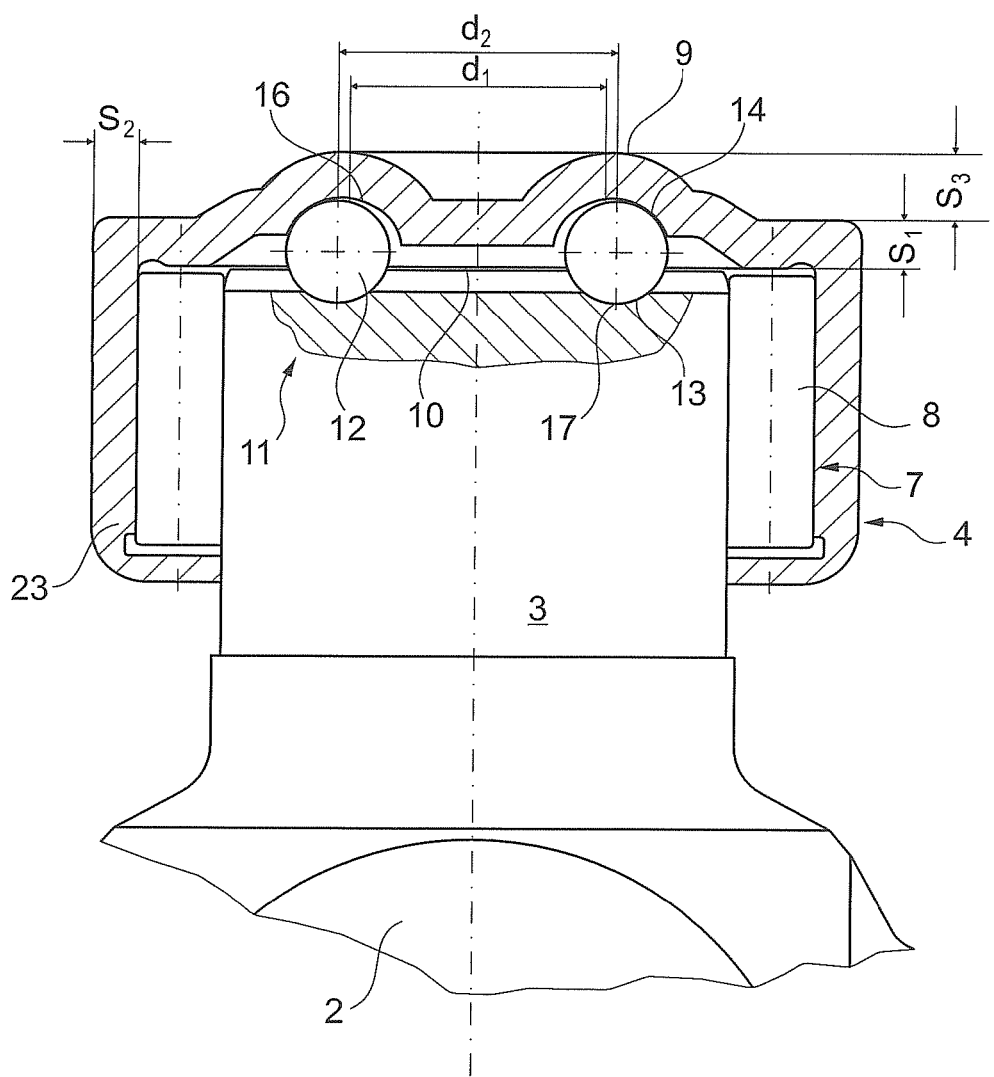
FIG. 2 shows an enlarged illustration of a journal of the universal joint in conjunction with a universal joint socket according to the invention illustrated in section.

Further details of the axial bearing 11 are shown in FIG. 2. The rolling bodies 12 of the axial bearing 11 are guided via raceways 13, 14 which are introduced in one end face 10 of the journal 3 and in the bottom 9 of the universal joint socket 4. To illustrate an axial bearing 11 designed as an inclined ball bearing, the raceway 14 has in the bottom 9 of the universal joint socket 4 a cross-sectional profile which is markedly enlarged with respect to the radius of the rolling body 12. The raceway 14 forms an apex line 16, the diameter of which is identified by "$d_1$". The further raceway 13, adapted as far as possible to the radius of the rolling bodies 12, in the end face 10 of the journal 3 forms the apex line 17, the diameter of which is identified by "$d_2$". On account of the diameter differences of the apex lines 16, 17, an intended edge support of the rolling bodies 12 in the raceway 14 is established, with the result that, in the event of an axial load on the journal 3 in the direction of the bottom 9 of the universal joint socket 4, a centering of the spider 2 occurs automatically via the axial bearing 11. Associated with this, simultaneously a centered universal joint 1 which is free of play in the axial direction can be implemented in a simplified way. The offset of the apex lines 16, 17 at the same time influences the pressure angle "$\alpha$" of the axial bearing 11, as illustrated by the direction of the arrow of the forces "$F_{B1}$" and "$F_{B2}$" according to FIG. 1. The universal joint socket 4 produced in a non-cutting way, preferably by means of a deep-drawing method, may have different wall thicknesses. For example, it is appropriate to design the wall thickness "$s_1$" in the bottom 9 so as to be smaller than the wall thickness "$s_2$" in a cylindrical portion 23 of the universal joint socket 4. The dimension "$s_3$" determines a projecting dimension which is established between the bottom 9 and the apex line 16 of the universal joint socket 4. The dimension "$s_3$" can be $\leqq 0.8$ mm. Also, in one embodiment, the diameters "$d_1$" and "$d_2$" of the apex lines 16 and 17 have a differential dimension amounting to $\geqq 0.5$ mm.

FIG. 3 shows schematically the set-up of a device 18, by means of which two universal joint sockets 4 are simultaneously pressed into bores 5a, 5b of the joint fork 6 of a cardan shaft 19. For this purpose, the joint fork 6 is fixed in position by means of spreadable holding jaws 20a, 20b before rams 21a, 21b each simultaneously press a universal joint socket 4 into the bore 5a, 5b of the joint fork 6. For this purpose, the spider 2 is previously brought into an exact position with respect to the joint fork 6, so that, during the pressing-in operation, the universal joint sockets 4 are pushed axially onto the journals 3 of the spider 2. The universal joint socket 4 has previously been fitted both with the radial bearing 7 and with the axial bearing 11. The pressing-in operation monitored by a measuring arrangement is terminated after a defined end position is reached, at which a desired prestress of the axial bearing 11 is established within the universal joint sockets 4.

Figure 4:
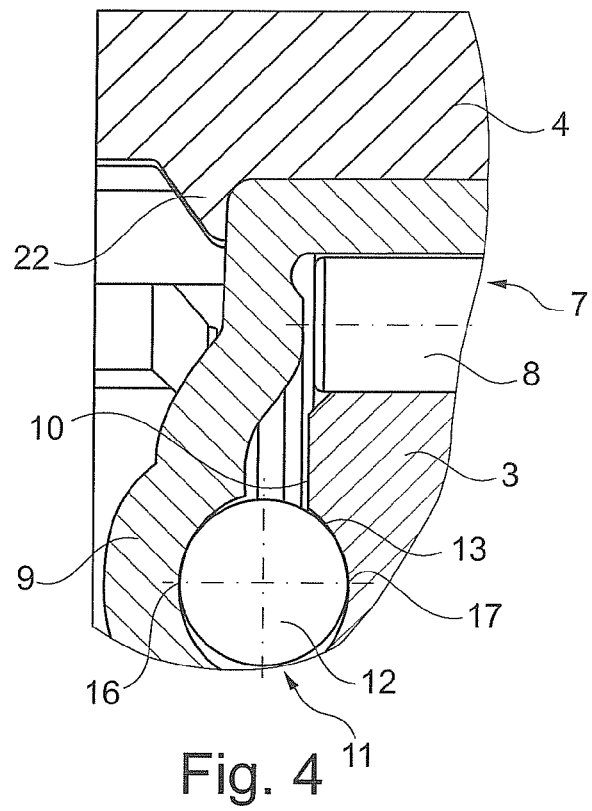
FIG. 4 shows an enlarged depiction of a detail of the device according to FIG. 3 which illustrates the forming of a stamped nose.

As illustrated in FIG. 4, after the operation of pressing in the universal joint sockets 4, stamped noses 22 are subsequently formed partially in the region of the bore 5a, 5b of the joint fork 6 by means of the rams 21a, 21b. The stamped noses 22 ensure a fixed installation position of the universal joint sockets 4 in the joint fork 6.

The universal joint of the present invention is particularly useful in connection with a cardan shaft of a vehicle steering mechanism.

REFERENCE NUMBERS

1 Universal joint
2 Spider
3 Journal
4 Universal joint socket
5a Bore
5b Bore
6 Joint fork
7 Radial bearing
8 Needle ring
9 Bottom
10 End face
11 Axial bearing
12 Rolling body
13 Raceway
14 Raceway
15 End face
16 Apex line
17 Apex line
18 Device
19 Cardan shaft
20a Holding jaw
20b Holding jaw
21a Ram
21b Ram
22 Stamped nose
23 Portion

The invention claimed is:

1. A universal joint, comprising:
a spider with journals which are offset at 90° with respect to one another; a universal joint socket that, in conjunction with a needle ring, holding a respective one of the journals in one of two joint forks in pairs;
a rolling body arranged between a bottom of the universal joint socket and an end face of the journal; and
an axial bearing designed as an angular ball bearing and comprising at least two rolling bodies, wherein the journal is supported, guided axially and centered on the bottom of the universal joint socket via the axial bearing, wherein the rolling bodies of the axial bearing are guided in raceways which are introduced in one end face of the journal and the bottom of the universal joint socket, wherein the raceways of the journal and of the bottom for the rolling bodies of the axial bearing have apex lines offset radially with respect to one another, and wherein the raceway in the end face of the journal bearing substantially conforms to the radius of the rolling bodies, and the raceway in the universal joint socket has a cross-section enlarged relative to the radius of the rolling bodies.

2. The universal joint as claimed in claim 1, wherein the apex lines of the raceways have different diameters "$d_1$" and "$d_2$", a differential dimension amounting to $\geqq 0.5$ mm.

3. The universal joint as claimed in claim 1, wherein the axial bearing of which includes a fully spherical arrangement of the rolling bodies.

4. The universal joint as claimed in claim 1, wherein the bottom of the universal joint socket having a wall thickness "$s_1$" which differs from a wall thickness "$s_2$" of a cylindrical portion of the universal joint socket.

5. The universal joint as claimed in claim 1, wherein the universal joint socket has a projecting dimension "$s_3$" of $\leqq 0.8$ mm between the apex line defined by the raceway and the bottom.

6. The universal joint as claimed in claim 1, wherein the joint is intended for a cardan shaft used in vehicle steering.

7. The universal joint as claimed in claim 1, wherein two universal joint sockets are each pressed by means of a device into opposite bores of a joint fork, synchronously with this the raceway for the rolling bodies of the axial bearing being formed in the bottom of the universal joint socket, before stamped noses are finally introduced partially into the bores of the joint fork in order to fix the universal joint socket in position.

* * * * *